United States Patent
Simons

(10) Patent No.: US 11,790,370 B2
(45) Date of Patent: Oct. 17, 2023

(54) TECHNIQUES FOR EXPEDITING PROCESSING OF BLOCKCHAIN TRANSACTIONS

(71) Applicant: AMERICORP INVESTMENTS LLC, Denver, CO (US)

(72) Inventor: Jordan Simons, Denver, CO (US)

(73) Assignee: Americorp Investments LLC, Denver, CO (US)

( * ) Notice: Subject to any disclaimer, the term of this patent is extended or adjusted under 35 U.S.C. 154(b) by 204 days.

(21) Appl. No.: 17/099,321

(22) Filed: Nov. 16, 2020

(65) Prior Publication Data

US 2021/0174368 A1 Jun. 10, 2021

Related U.S. Application Data

(63) Continuation of application No. 16/528,430, filed on Jul. 31, 2019, now Pat. No. 10,839,395.

(Continued)

(51) Int. Cl.
*G06Q 40/00* (2023.01)
*G06Q 20/40* (2012.01)
(Continued)

(52) U.S. Cl.
CPC ....... *G06Q 20/4016* (2013.01); *H04L 9/3236* (2013.01); *H04L 9/50* (2022.05); *H04L 2209/56* (2013.01)

(58) Field of Classification Search
CPC .......................... G06Q 20/4016; H04L 9/3236
See application file for complete search history.

(56) References Cited

U.S. PATENT DOCUMENTS

| 9,397,985 B1 | 7/2016 | Seger, II et al. |
| 10,114,969 B1 | 10/2018 | Chaney et al. |

(Continued)

FOREIGN PATENT DOCUMENTS

| CN | 107683493 | * | 2/2018 | ............. G06Q 40/04 |
| CN | 107683493 A | | 2/2018 | |
| GB | 2572627 | * | 5/2018 | ............. G06Q 20/06 |

OTHER PUBLICATIONS

Cong et al., "A Blockchain Consensus Protocol With Horizontal Scalability," ISBN 978-3-9031 76-08-9 2018 (Year: 2018).*

(Continued)

*Primary Examiner* — Abhishek Vyas
*Assistant Examiner* — William B. Bunker
(74) *Attorney, Agent, or Firm* — Ortiz & Lopez, PLLC; Luis M. Ortiz; Kermit D. Lopez

(57) ABSTRACT

Technology is disclosed herein for expediting blockchain transactions. More specifically, the technology describes techniques for assessing risk associated with expediting processing of blockchain transactions received by a transaction processing platform. When a determination is made that a transaction can be expedited, the transaction processing platform can expedite the transaction, e.g., locally process the blockchain transaction, prior to receiving a verification or confirmation from the consensus network. In this manner, the transaction processing platform can act like a local cache allowing quick access and operation on permanently stored data within the blockchain with minimal or calculated risk.

23 Claims, 10 Drawing Sheets

Related U.S. Application Data

(60) Provisional application No. 62/712,449, filed on Jul. 31, 2018.

(51) Int. Cl.
*H04L 9/32* (2006.01)
*H04L 9/00* (2022.01)

(56) References Cited

U.S. PATENT DOCUMENTS

| | | | |
|---|---|---|---|
| 10,333,694 B1 | 6/2019 | Hu et al. | |
| 10,355,869 B2 | 7/2019 | Bisti | |
| 10,438,181 B2 | 10/2019 | Hammad | |
| 10,521,861 B1* | 12/2019 | Ju | G06Q 20/389 |
| 10,616,324 B1 | 4/2020 | Kaddoura | |
| 11,146,535 B2* | 10/2021 | Castagna | H04L 63/0407 |
| 2015/0332283 A1 | 11/2015 | Witchey | |
| 2016/0224949 A1 | 8/2016 | Thomas et al. | |
| 2016/0260169 A1* | 9/2016 | Arnold | G06Q 20/023 |
| 2016/0292672 A1 | 10/2016 | Fay et al. | |
| 2016/0342978 A1* | 11/2016 | Davis | G06Q 20/38215 |
| 2018/0025435 A1 | 1/2018 | Karame et al. | |
| 2018/0060860 A1 | 3/2018 | Tian et al. | |
| 2018/0075453 A1 | 3/2018 | Durvasula et al. | |
| 2018/0101848 A1* | 4/2018 | Castagna | G06F 9/5016 |
| 2018/0103042 A1 | 4/2018 | Castagna et al. | |
| 2018/0145836 A1* | 5/2018 | Saur | G06Q 20/3829 |
| 2018/0189333 A1 | 7/2018 | Childress et al. | |
| 2018/0191502 A1 | 7/2018 | Karame | |
| 2018/0276626 A1 | 9/2018 | Laiben | |
| 2018/0300693 A1 | 10/2018 | Gopinath et al. | |
| 2019/0014124 A1 | 1/2019 | Reddy et al. | |
| 2019/0132350 A1* | 5/2019 | Smith | G06F 21/577 |
| 2019/0220324 A1 | 7/2019 | Carver et al. | |
| 2019/0260574 A1 | 8/2019 | Shi et al. | |
| 2019/0378133 A1* | 12/2019 | Deshpande | H04L 9/3263 |
| 2020/0027005 A1* | 1/2020 | Harrison | H04L 41/16 |
| 2021/0326886 A1* | 10/2021 | Tang | G06Q 50/26 |

OTHER PUBLICATIONS

Amsden, Zachary et al., "The Libra Blockchain," https://developers.libra.org/docs/assets/papers/the-libra-blockchain.pdf, 29 pages, Jul. 23, 2019.

Casey, Michael J., "Libra's Biggest Problem," CoinDesk, https://www.coindesk.com/libras-biggest-problem, 5 pages, Jul. 22, 2019.

Cong, Kelong et al., "A Blockchain Consensus Protocol With Horizontal Scalability," 2018 IFIP Networking Conference And Workshops, pp. 424-432, May 14-16, 2018.

Guest Post, "Decentralized Cyrpto-Betting Platform Betmatch Raises The Bar," BTC Manager, https://btcmanager.com/decentralized-crypto-betting-platform-betmatch-raises-the-bar/, 4 pages, Jul. 19, 2019.

International Application No. PCT/US2019/044544, International Search Report & Written Opinion, 9 pages, dated Oct. 11, 2019.

Libra Association, "Libra White Paper," https://libra.org/en-US/white-paper/#introduction, 17 pages, Jul. 30, 2019.

Lopes, Laisa, "US SEC Clears Blockchain Gaming Company To Sell 'Quarters' Tokens," The Blockchain Land, 3 pages, Jul. 26, 2019.

O'Sullivan, Corlynne, "Blockchain Interoperability—The Value Of Cross Chain Technology For User Adoption," Medium, https://blog.usejournal.com/blockchain-interoperability-the-value-of-cross-chain-technology-on-user-adoption-ac4363ffa1a3, 5 pages, May 8, 2019.

Ray, Shaan, "What Are Sidechains?," Hackemoon Newsletter, https://hackernoon.com/what-are-sidechains-1c45ea2daf3, 8 pages, Jan. 21, 2018.

RSK Labs, "Sidechains, Drivechains, And RSK 2-Way Peg Design," https://www.rsk.co/noticia/sidechains-drivechains-and-rsk-2-way-peg-design/, 11 pages, Apr. 17, 2019.

Simonsen, Scott, "Quantum Communication Just Took A Great Leap Forward," Singularity Education Group, https://singularityhub.com/2018/12/26/quantum-communication-just-took-a-great-leap-forward/, 4 pages, Dec. 26, 2018.

Vigna, Paul, "Facebook's Libra Could Aid Law Enforcement," The Wall Street Journal, https://www.wsj.com/articles/facebooks-libra-could-aid-law-enforcement-11564479008, 1 page, Jul. 30, 2019.

* cited by examiner

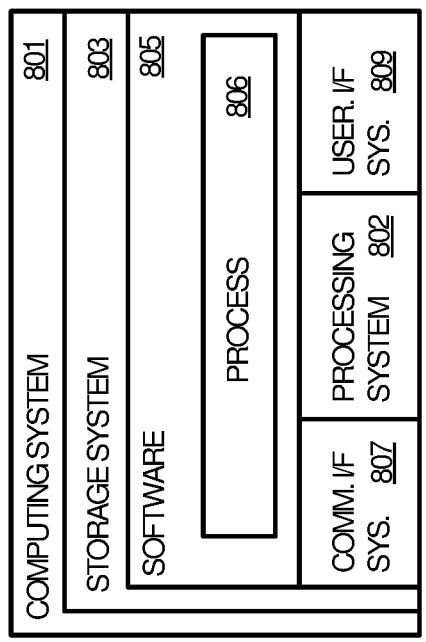

TECHNIQUES FOR EXPEDITING PROCESSING OF BLOCKCHAIN TRANSACTIONS

CROSS-REFERENCE TO RELATED APPLICATION

This application is a continuation of U.S. patent application Ser. No. 16/528,430 filed Jul. 31, 2019, and issued as U.S. Pat. No. 10,839,395 on Nov. 17, 2020; which claims priority to U.S. Provisional Patent Application No. 62/712,449 filed Jul. 31, 2018, each of which is incorporated herein by reference in its entirety for all purposes.

BACKGROUND

Blockchain technology generally allows a network of computers (or nodes) to agree at regular intervals regarding a state (or chronological ordering of blockchain transactions) of a distributed ledger (or blockchain). The network of computers (or nodes) is typically a peer-to-peer network (P2P) referred to as a consensus network. The distributed ledger (or blockchain) can contain various types of shared data, such as transaction records, attributes of transactions, credentials, currency, digital rights, intellectual property, identity, property titles, or other pieces of information. However, because there is no central entity in blockchain technology, trust and security are extremely important.

The ledgers are secured through a mix of cryptography and game theory. For example, in addition to the transaction information, each block of a blockchain typically includes a hash of its own contents and a hash of the contents of the previous block. Thus, any attempt to change the contents of the block can quickly and easily be detected. The hash of the previous block creates an immutable chain of blocks and facilitates blockchain security. However, the hashing mechanism is not enough to prevent tampering as a block and corresponding hash can be modified and all subsequent hashes quickly recalculated to again make the blockchain valid. To mitigate against this, blockchain technology includes a proof-of-work mechanism. The proof-of-work mechanism slows down the creation of new blocks. For example, in the case of Bitcoin, it takes approximately ten minutes to calculate the required proof-of-work and add a new block to the chain. The proof-of-work mechanism makes it difficult to tamper with the contents of a block because if one block is tampered with, the proof-of-work for all subsequent blocks also needs to be recalculated.

The consensus network provides a third mechanism of security. Specifically, when a node creates a new block of one or more blockchain transactions, the block is sent to all nodes on the network. Each node then verifies the block to make sure that the block has not been tampered with and, if not, the node adds the block to their blockchain (or ledger). The nodes create consensus about which blocks are valid and which are not. Consequently, to successfully tamper with a blockchain, you need to tamper with all the blocks on the chain, redo the proof-of-work for each block and take control of more than fifty percent of the P2P network. Only then will the tampered block be accepted with a consensus.

Unfortunately, the various security mechanisms make obtaining at least a degree of certainty that a blockchain transaction is valid relatively slow, (e.g., the blockchain transaction must first be added to a block, a proof-of-work calculated for the block, and a consensus achieved among the nodes that the block is valid and that the block is the next block in the blockchain).

Overall, the examples herein of some prior or related systems and their associated limitations are intended to be illustrative and not exclusive. Upon reading the following, other limitations of existing or prior systems will become apparent to those of skill in the art.

BRIEF SUMMARY

Examples discussed herein relate to techniques for expediting blockchain transaction processing. More specifically, the examples relate to techniques for assessing risk associated with expediting processing of blockchain transactions received by a transaction processing platform and, when the transaction can be expedited, locally processing the blockchain transactions prior to receiving an indication that the blockchain transaction is valid from a consensus network. In an implementation, a method of operating a transaction processing platform for expediting blockchain transactions is disclosed. The method includes receiving a transaction request initiated by an endpoint system. The transaction request identifies a blockchain transaction including one or more transaction participants. The method further includes performing a risk assessment to determine a risk associated with expediting processing of the blockchain transaction and determining, based on an output of a risk assessment, if the blockchain transaction can be expedited by the transaction processing platform. The method further includes processing the blockchain transaction using information or attributes obtained from the shadow copy of the distributed ledger when the blockchain transaction can be expedited by the transaction processing platform and prior to receiving a notification initiated by a distributed blockchain consensus network that the blockchain transaction is confirmed.

Embodiments of the present invention also include apparatuses, systems and computer-readable storage media containing instructions to cause one or more processors to perform the methods, variations of the methods, and other operations described herein.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

This Summary is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

FIG. 8 is a block diagram illustrating a computing system suitable for implementing the technology disclosed herein, including any of the applications, architectures, elements, processes, and operational scenarios and sequences illustrated in the Figures and discussed below in the Technical Disclosure.

DETAILED DESCRIPTION

Figure 1A:
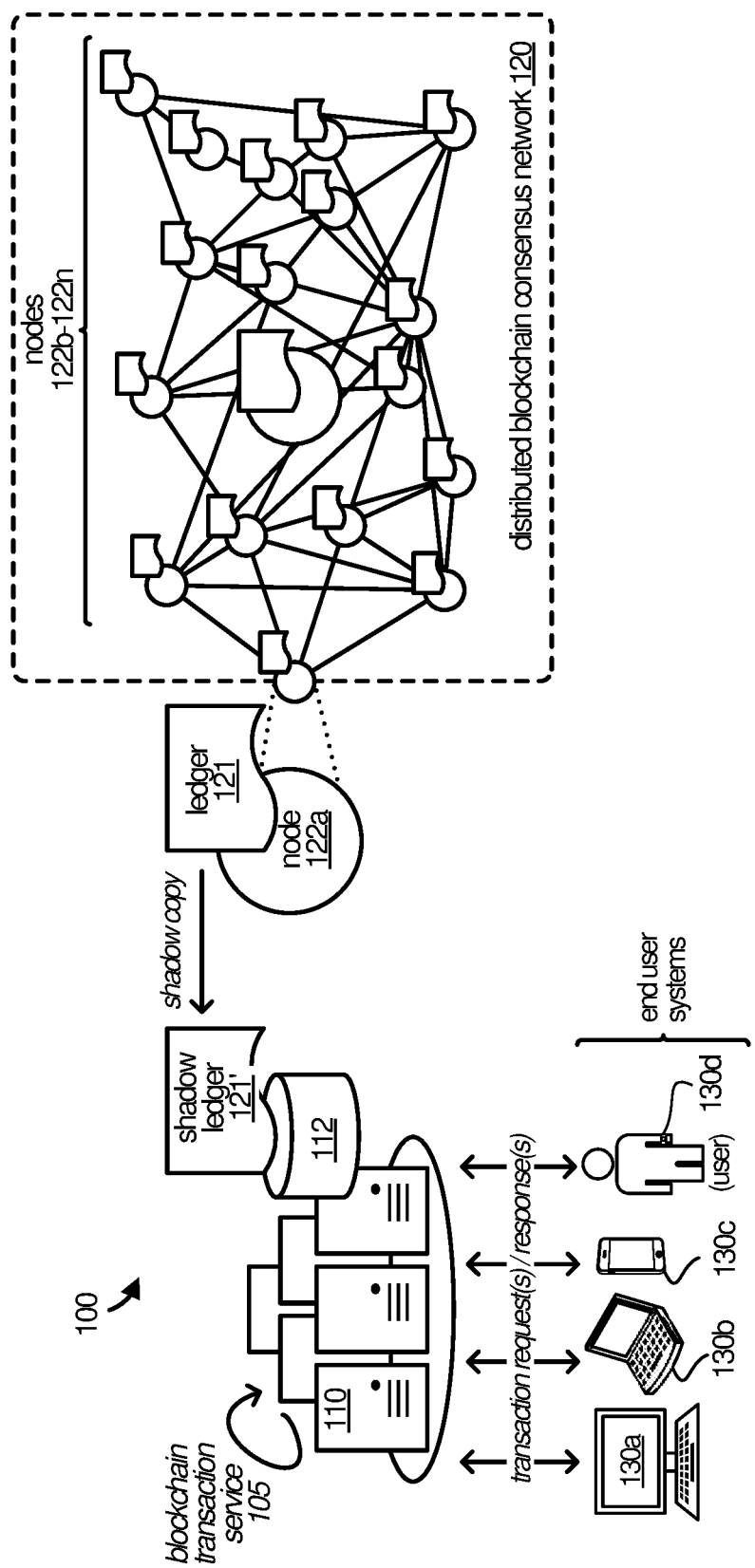
FIG. 1A depicts a block diagram illustrating an example operational architecture operable to locally expedite blockchain transaction processing, according to some implementations.

Technology is disclosed herein for expediting blockchain transactions. More specifically, the technology describes techniques for assessing risk associated with expediting processing of blockchain transactions received by a transaction processing platform. When a determination is made that a transaction can be expedited, the transaction processing platform can expedite the transaction, e.g., locally process the blockchain transaction, prior to receiving a verification or confirmation from the consensus network. In this manner, the transaction processing platform can act like a local cache allowing quick access and operation on permanently stored data within the blockchain with minimal or calculated risk.

The blockchain transactions can be processed using information and/or attributes of the distributed ledger that are stored locally on the transaction processing platform. In some implementations, a shadow copy of the distributed ledger stores only certain aspects (e.g., information about the existence, verification data, hash, etc.) of transactions or contracts. These aspects can be maintained and indexed by the transaction processing platform for quick access and operations on permanently stored data within the blockchain.

In some implementations, the transaction processing platform is operable to subsequently verify the validity of expedited blockchain transactions. For example, when a transaction confirmation is received from the distributed blockchain consensus network, the transaction processing platform is operable to update the shadow copy of the distributed ledger and/or re-index. Additionally, when the transaction processing platform receives a response from the distributed blockchain consensus network indicating that a locally expedited transaction is invalid, then the transaction processing platform is operable to perform one or more reconciliation actions. If, for example, the blockchain transaction is a financial transaction, then a reconciliation action can include notifications and/or attempts to unwind the transaction or obtain alternative arrangements (e.g., an alternative form of payment for a financial transaction).

In some implementations, determining a risk associated with expediting the processing of a blockchain transaction can include calculating and/or identifying a risk score associated with expediting the blockchain transaction. The risk score can be determined based, at least in part, on permanently stored data or information within the distributed ledger. For example, historical blockchain transactions and/or other information identifiable or maintainable by the transaction processing platform. Additionally, in some implementations, calculating the risk score can include identifying one or more transaction participants associated with a particular blockchain transaction and accessing and/or otherwise determining a reputational score for each of the one or more transaction participants.

In some implementations, a reputational score for particular participant can be determined based on past interactions with the blockchain—including failed transactions, other contractual or financial dealings, other reputational information accessible to the transaction processing platform, e.g., credit scores, recent financial dealings, criminal records, etc. In some implementations, a learning engine can be included to apply machine learning algorithms to identify or build reputational models associated with known participants.

In some implementations, a handshaking or verification protocol can be used to confirm data stored by the transaction processing platform including data contained in the shadow copy of the distributed ledger and/or information and/or attributes of the distributed ledger that are stored locally on the transaction processing platform, e.g., indexed information.

Various technical effects are enabled by the techniques discussed herein. For example, the techniques enable the transaction processing platform to act like a local cache allowing quicker access (e.g., without the need to wait for proof-of-work calculations and consensus) and operation on permanently stored data within the blockchain with minimal or calculated risk. One of the busiest areas of blockchain application so far is by companies seeking to offer low cost, secure, verifiable payments and settlement. Among other benefits, the techniques discussed herein can dramatically increase the speed of these financial transactions while minimizing risk. As another example, various implementations of the transaction processing platform and/or blockchain networks may provide interoperability to allow for communication, validation, translation, and the like between different blockchains.

The improvements to blockchain technologies discussed herein are primarily described with reference to financial (e.g., cryptocurrency) blockchain transactions. However, it is appreciated that the improvements are equally applicable to any industry where blockchain technologies are deployed including but not limited to, gaming, stocks, shipping tracking, know your customer, anti-money laundering, artificial intelligence, machine learning, and many other technologies.

FIG. 1A depicts a block diagram illustrating an example operational architecture 100 operable to locally expedite blockchain transaction processing, according to some implementations. More specifically, the example operational architecture 100 illustrates a transaction processing platform 110 capable of executing a blockchain transaction service 105. When executed, the blockchain transaction service 105 directs the transaction processing platform 110 to assess risk associated with expediting processing of blockchain transactions received by the transaction processing platform 110. When the transaction processing platform 110 determines that a transaction can be expedited, it locally processes the blockchain transaction prior to receiving a confirmation message from a distributed blockchain consensus network 120.

As shown in the example of FIG. 1A, the operational architecture 100 includes the transaction processing platform 110, various end-user systems 130*a*-130*d* associated with users, and the distributed blockchain consensus network 120. Additional or fewer systems or components are possible.

The transaction processing platform 110 includes a data repository 112 which can store a shadow copy of a distributed ledger 121' and/or information extracted from the shadow copy of a distributed ledger 121'. The information extracted from the shadow copy of the distributed ledger 121' can include indexed ledger information, various attributes of the distributed leger, etc. The shadow copy of the distributed ledger 121' may be a copy of the distributed ledger or certain aspects (e.g., information about the existence, verification data, hash, etc.) of transactions or contracts.

The distributed blockchain consensus network 120 includes various nodes 122*a*-122*n* operable to verify transactions and achieve consensus. Each node includes a copy of distributed ledger 121. FIG. 1A illustrates an exploded view of node 122*a* (also referred to herein as edge or shadow node 122*a*). Although not shown in the example of FIG. 1A, in some implementations, some or all of the functionality of edge or shadow node 122*a* can be included within the transaction processing platform 110.

Each node of the distributed blockchain consensus network 120 includes a copy of ledger 121. As discussed above, the nodes 122*a*-122*n* operate to agree at regular intervals regarding a state of the ledger (or blockchain) 121. In some implementations, blockchain transactions can be submitted to the distributed blockchain consensus network 120. The blockchain transaction are considered unconfirmed until packaged in a block that is added to the blockchain. Any node of the various nodes 122*a*-122*n* can collect the unconfirmed blockchain transactions into a block and broadcasts the block as a suggestion of what the next block in the blockchain should be. As discussed above, each block includes a proof-of-work and the first node in the distributed blockchain consensus network 120 to solve the proof-of-work, broadcasts the block with a solution. The other nodes verify the block and the solution and, once verified, the block becomes the next block in the chain. Blockchain transactions included in the valid block are confirmed or valid transactions (accepted).

In this manner, the blockchain transactions are recorded chronologically, forming an immutable chain, and can be more or less private or anonymous depending on how the technology is implemented. As noted above, the ledger 121 is distributed across many participants in the network—it doesn't exist in one place. Instead, copies exist and are simultaneously updated with every fully participating node 122*a*-122*n* in the distributed blockchain consensus network 120. The blocks can represent transactions and data of many types—currency, digital rights, intellectual property, identity, or property titles, to name a few.

The transaction processing platform 101 is representative of any service or collection of services that is configured to implement the blockchain transaction service 105 for expediting processing of blockchain transactions. Initially, the transaction processing platform 101 requests and receives a shadow copy of the distributed ledger 121'. In some implementations, the transaction processing platform 101 is operable to process and/or otherwise analyze the shadow copy of the distributed ledger 121' to identify relevant information or attributes. In some implementations, only certain aspects, e.g., the relevant information or attributes (e.g., information about the existence, verification data, hash, etc.) are persistently stored in data repository 112. These aspects (or the entire shadow copy of the distributed ledger 121') can be maintained and indexed by the transaction processing platform for quick access and operations on permanently stored data within the blockchain.

In operation, the transaction processing platform 110 is configured to receive transaction requests initiated by end-user systems 130*a*-130*n*. Each transaction request can identify a blockchain transaction including one or more transaction participants. The transaction processing platform 101 processes the transaction requests and assesses risks associated with expediting the processing of blockchain transactions. When a determination is made that a particular transaction can be expedited, the transaction processing platform 110 can expedite processing of that transaction, e.g., locally process the blockchain transaction, prior to receiving a notification initiated by a distributed blockchain consensus network 120 that the blockchain transaction is accepted or denied. In some embodiments, the notification comprises an indication that the blockchain transaction has been packaged in a block that has been added to the ledger (or blockchain) 121. The transaction processing platform 110 also submits or transfers the transaction request for submission to the distributed blockchain consensus network.

The transaction processing platform 110 may include server computers, blade servers, rack servers, and any other type of computing system (or collection thereof) suitable for executing the blockchain transactions. Such systems may employ one or more virtual machines, containers, or any other type of virtual computing resource in the context of monitoring a particular or predetermined health-related condition or generating and pushing out a monitoring service of which computing system 801 of FIG. 8 is representative.

While FIG. 1A only illustrates a single transaction processing platform 110 and shadow ledger, various implementation may include multiple instantiations of transaction processing platforms and shadow ledgers. These platforms may be able to securely communicate with each other and update transactions. For example, various advanced communication and security protocols and techniques may be used. In some implementations, the transaction processing platform, devices, consensus network, may be connected using $5^{th}$ generation wireless networks, optical communication systems (e.g., photonics), satellite communications (e.g., quantum satellite systems), and the like.

Some implementations may use quantum entanglement security protocols to send communications between components (e.g., user device, platform, consensus network, etc.). Quantum communication using the principle of quantum entanglement is very secure because any interference is detectable as any eavesdropper would alter the entanglement. In some implementations, each node can include one or more quantum processors and quantum chipsets which rely on qubits (quantum bits) for the storage of the data. Superposition allows for multiple simultaneous computations and these quantum processors create a quantum entanglement upon changing states of the photons. The transmitting node and the receiving node can each hold half of the entangled photons and each of these nodes can modified simultaneously creating secure communication system as any interception would disentangle the photons. Some implementations may use a series of quantum repeaters to allow long distance communications via the optical communication systems.

One advantage of the use of phonic communication systems is the ability to speed of the communication. Other techniques within data storage may be used to speed up access to the data on the shadow ledger 121 and nodes 122a-122n. For example, some implementations may use a type of database partitioning called "sharding" that separates very large databases the into smaller, faster, more easily managed parts called data shards. These and other techniques can deal with latency issues and can be expanded to peer-to-peer (P2P) systems.

Each node 122a-122n is representative of any computing device, such as a server computer, blade server, rack server, and/or any other type of computing system (or collection thereof) suitable for maintaining and updating a copy of the distributed ledger, (e.g., validating transactions, creating new blocks, creating consensus, etc.). Such systems may employ one or more virtual machines, containers, or any other type of virtual computing resource in the context of maintaining and updating the distributed ledger of which computing system 801 of FIG. 8 is also representative.

Each end-user system 130a-130n is representative of any computing device, such as a desktop computer, laptop, tablet, mobile phone, smart watch, gaming device, etc., of which computing system 801 of FIG. 8 is also representative.

Some implementations allow a decentralized (but somewhat restricted) implementation of the blockchains. This can be used for restricting data and verifying information, people, and the like which may be needed for legal compliance with Know Your Customer (KYC) and Anti-Money Laundering (AML) laws. Moreover, some implementations may facilitate blockchain interoperability. This can be done, for example, by keeping multiple different shadow ledgers at blockchain transaction service 105. The interoperability that allows for exchange and use of information in a collaborative manner. This may be useful for inter-agency data shares (e.g., between doctors and hospitals, different governmental agencies, etc.). As another example, different financial institutions may be maintaining private blockchains and blockchain transaction service 105 can allow for interoperability that would allow for movement of value from one blockchain to another. As such, some implementations of blockchain transaction service 105 may verify data, format data, decrypt and encrypt data, and/or perform other operations (e.g., compute exchange rates) that may be needed to facilitate the interoperability.

In some implementations, blockchain transaction service 105 may scrub, aggregate, remove, encrypt, hide, overwrite, other otherwise obfuscate portions of data during the interoperability process. For example, governmental agencies may require the collection or reporting of various data or statistics. The reporting entity and the governmental agency may both be using different blockchains. However, certain information may not need to be reported. As such, blockchain transaction service 105 can create a customized data transfer packet which can be communicated to the destination block without oversharing the information. Moreover, blockchain transaction service 105 may be able to collect information from both parties dependently and make decisions that can be reported back. Blockchain transaction service 105 may create a decision record (within a different blockchain with pointers or references to the participating ledgers). Blockchain transaction service 105 may also use decentralized applications, wallets, and/or other peripheral interfaces.

Figure 1B:
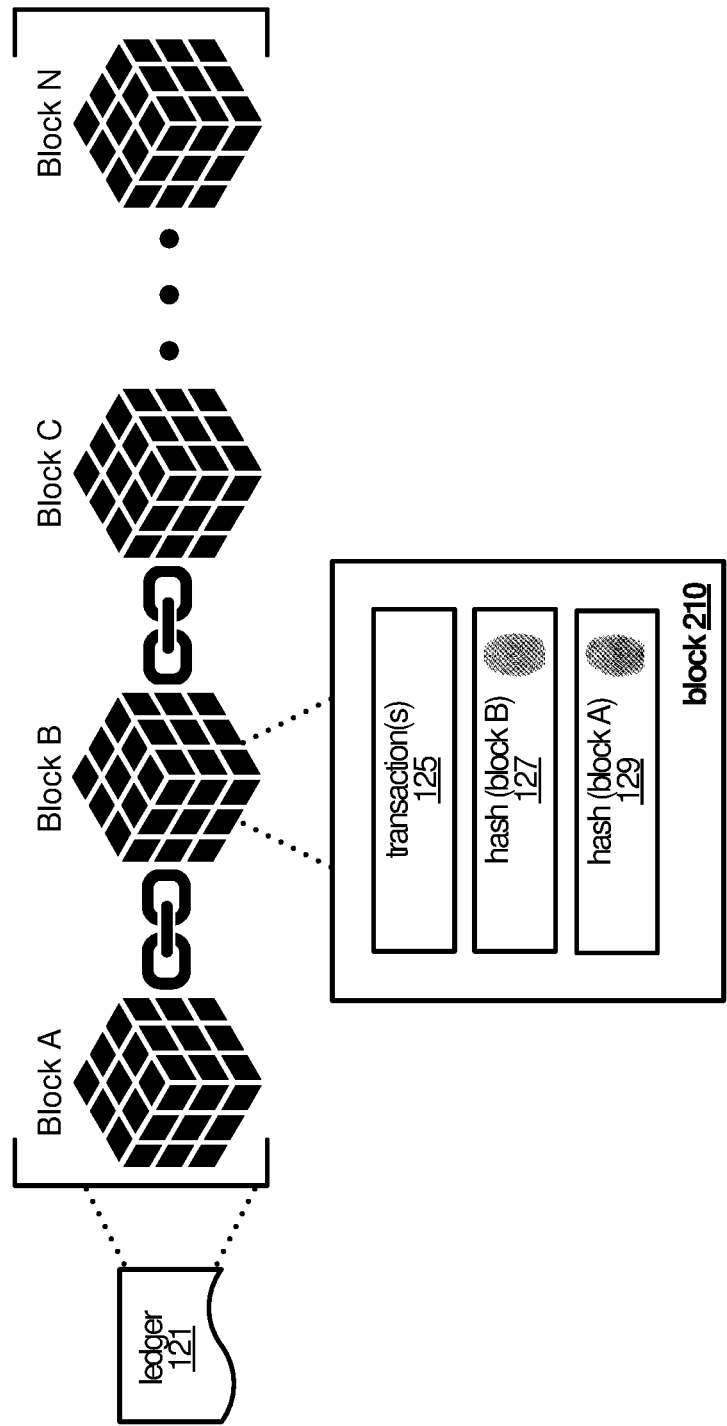
FIG. 1B depicts example contents of blockchain, according to some implementations.

FIG. 1B depicts example contents of blockchain 121, according to some implementations. The blockchain 121 includes multiple blocks A, B, C, . . . N. As discussed herein, each block includes data, a hash of the block, and a hash of the previous block. An exploded view of the elements of block B are also shown. Specifically, block B includes data (e.g., transactions) 125, a hash of block B 127, and a hash of block A 129 (previous block).

The data 125 that is stored depends on the type of blockchain. The Bitcoin blockchain, for example, each block includes multiple transactions each having one or more transaction details such as the sender, the receiver, and the amount of coins transferred. The block also includes a hash, e.g., hash of block B 127, that uniquely identifies the block and all of its contents. When a block is created, a hash is created for the block. Any attempt to changed something inside the block can quickly and easily be detected based on the hash. The hash of the previous block, e.g., hash of block A 129 creates a chain of blocks and makes the blockchain secure. Thus, changing a block causes all subsequent blocks to become invalid as they no longer contain a valid hash of the previous block.

While not illustrated in FIG. 1B, some implementations may use sidechains, drive chains, multi-sig custody and hybrid design. For example, a sidechain or childchain allows for interchangeability between blockchains. Some implementation may use a sidechain to securely move digital assets (e.g., tokens) between separate blockchains. The sidechain can be attached to a main chain (e.g., primary or parent chain) using a two-way peg that enables interchangeability of assets at a predetermined rate between the parent blockchain and the sidechain.

As noted above, the hashing is not enough to prevent tampering as a computer (or network of computers) could potentially tamper with a block and recalculate all of the hashes of the subsequent blocks to make the blockchain valid again. To mitigate against this, blockchains have something called proof-of-work. The proof-of-work is a mechanism that slows down the creation of new blocks. In the case of Bitcoin, it takes approximately ten minutes to calculate the required proof-of-work and add a new block to the chain. This mechanism makes it difficult to tamper with block because if a block is tampered with, the proof-of-work for all subsequent blocks needs to be recalculated. Consequently, as discussed above, the security of blockchain technology comes from the use of hashing and the proof-of-work mechanism.

One additional layer of security for blockchain technology comes from its distributed nature. As noted above, there is not central entity in blockchain technology. Rather, blockchain technology utilizes a P2P network. When a node joins the distributed network, the node receives a full copy of the blockchain (or distributed ledger). The node can use the blockchain (or distributed ledger) to verify past, current and future transactions. For example, when a node creates a new block, the new block is sent to everyone on the network.

Each node then verifies the block to make sure that the block has not been tampered with and, if everything checks out, each node adds this block to their own blockchain (or distributed ledger). All the nodes create consensus—agree about which blocks are valid and which are not valid. Blocks that are tampered with are rejected by other nodes in the network.

Consequently, to successfully tamper with a blockchain, a malicious party needs to tamper with all the blocks on the chain, redo the proof-of-work for each block and take control of more than 50% of the P2P network to create a consensus. Only then will the tampered block be accepted by all nodes of the consensus network. Some implementations may use any other consensus decision making or consensus mechanism including, but not limited to, Proof of Stake (PoS), Distributed Proof of Stake (DPoS), directed acyclical graphs (DAGS), Byzantine Fault Tolerant (BFT) consensus approach, and/or other consensus mechanisms.

Some implementations may extend additional security techniques to concepts like the Internet of Things (IoT) and shared data layer examples. For example, in some implementations a new proof (proof of verification) that can be used for data access transactions in combination with blockchain concepts such as consensus determinations, to verify data access and modification transactions. This can help address data breaches which are becoming more common. For example, many social media companies take user data and sell it off. The techniques disclosed herein can be applied to the use of blockchain and decentralized management of such data is that individual users can own their data. When the data is to be accessed, used, sold, etc., applications/services would confirm the use with the individual user to prevent unauthorized use of user data. To incentive users to share, users can be provided with rewards for sharing data.

In other implementations, IoT devices (e.g., HVAC system, timed safes, etc.) can be controlled by a smart device, where the user has set a schedule for the system to operate. If a request comes in for a change to that schedule (e.g., user remotely accesses or a hack of the TOT system is being initiated), then the proof of verification theorem (and consensus determination) can be used to validate that the user is making the request and the system is not compromised.

Figure 2:
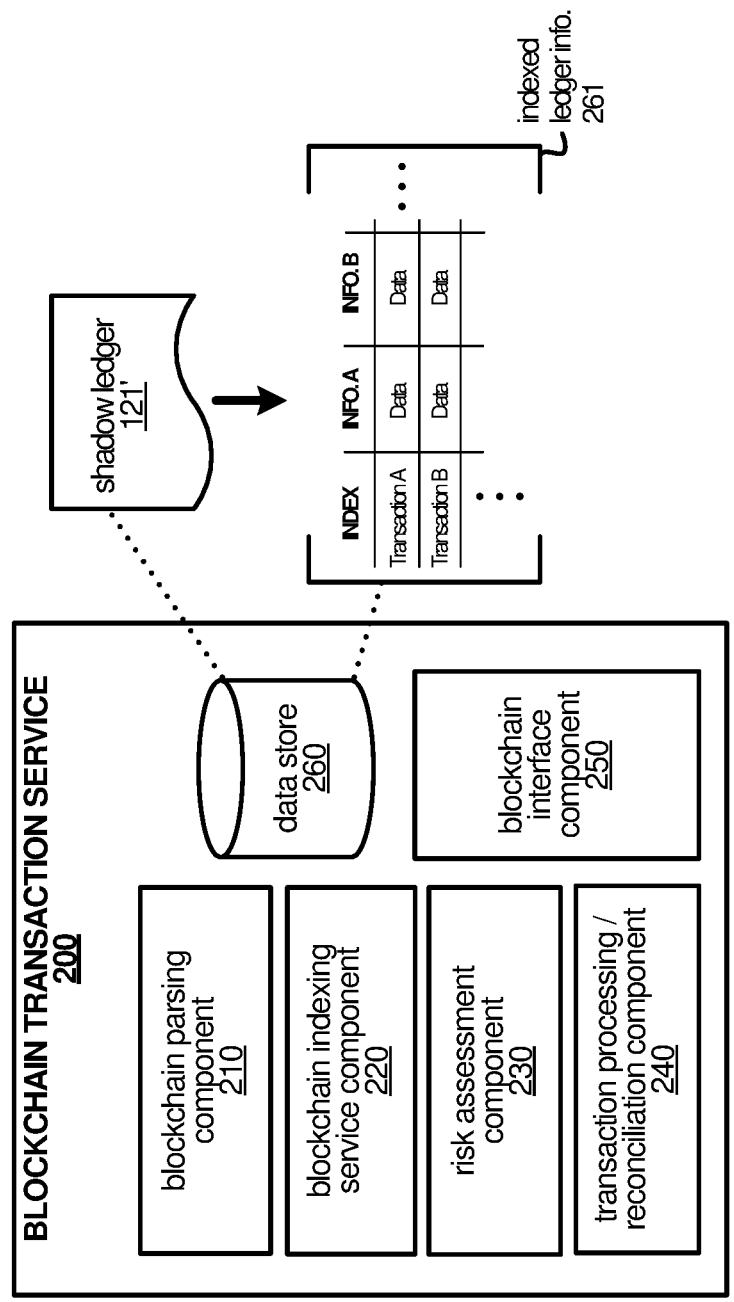
FIG. 2 depicts example components of a blockchain transaction service, according to some implementations.

FIG. 2 depicts example components of a blockchain transaction service 200, according to some implementations. The blockchain transaction service 200 can be blockchain transaction service 105 of FIG. 1A, although alternative configurations are possible. The components of the blockchain transaction service 200 can be executed on computing systems such as, for example, the transaction processing platform 110 of FIG. 1, or one or more processors, extensions, modules, engines, components or tools associated therewith. The functions represented by the components can be implemented individually or in any combination thereof, partially or wholly, in hardware (circuitry), software, or a combination of hardware and software. In some implementations, the components of the blockchain transaction service 200 can be distributed across multiple discrete systems.

The blockchain transaction service 200 includes a blockchain parsing component 210, a blockchain indexing component 220, a risk assessment component 230 a transaction processing/reconciliation component 240, a blockchain interface component 250 and a data store 260. As shown in the example of FIG. 2, the data shore 260 is configured to persistently store.

The functions represented by the components can be implemented individually or in any combination thereof, partially or wholly, in hardware, software, or a combination of hardware and software. In some implementations, the components of the blockchain transaction service 200 can be distributed across multiple discrete systems. Additional or fewer components are possible.

The blockchain parsing component 210 is configured to process a copy of the distributed ledger to identify the aspects that are maintained and indexed by the transaction processing platform for quick access and operations on permanently stored data within the blockchain. The blockchain parsing component 210 also processes updates or new blocks or transactions received from the edge or shadow node.

The blockchain indexing component 220 is configured to generate and maintain the index of blockchain transactions. The updates including new block and transactions are also indexed by the blockchain indexing component 220. The blockchain indexing component 220 can also perform searches of the indexed data when performing risk assessments. As shown in the example of FIG. 2, the blockchain indexing component 220 is operable to index the shadow copy of the distributed ledger 121' to created indexed ledger information 261.

The risk assessment component 230 is configured to perform the risk assessments to determine the risk associated with expediting the processing of the blockchain transactions. In some implementations, this process includes determining a risk score associated with the blockchain transaction and comparing the risk score to a risk threshold. When the risk score is less than the predetermined risk threshold, the transaction can be expedited by the transaction processing platform. An example illustrating performance of a risk assessment including calculation of a risk score is shown and discussed in greater detail with reference to FIG. 6.

The transaction processing/reconciliation component 240 is configured to perform the expedited transaction processing and perform the various other processing tasks and procedures discussed herein including any necessary reconciliation actions.

The blockchain interface component 250 is configured to communicate with the edge or shadow node via one or more protocols as discussed herein.

Figure 3A:
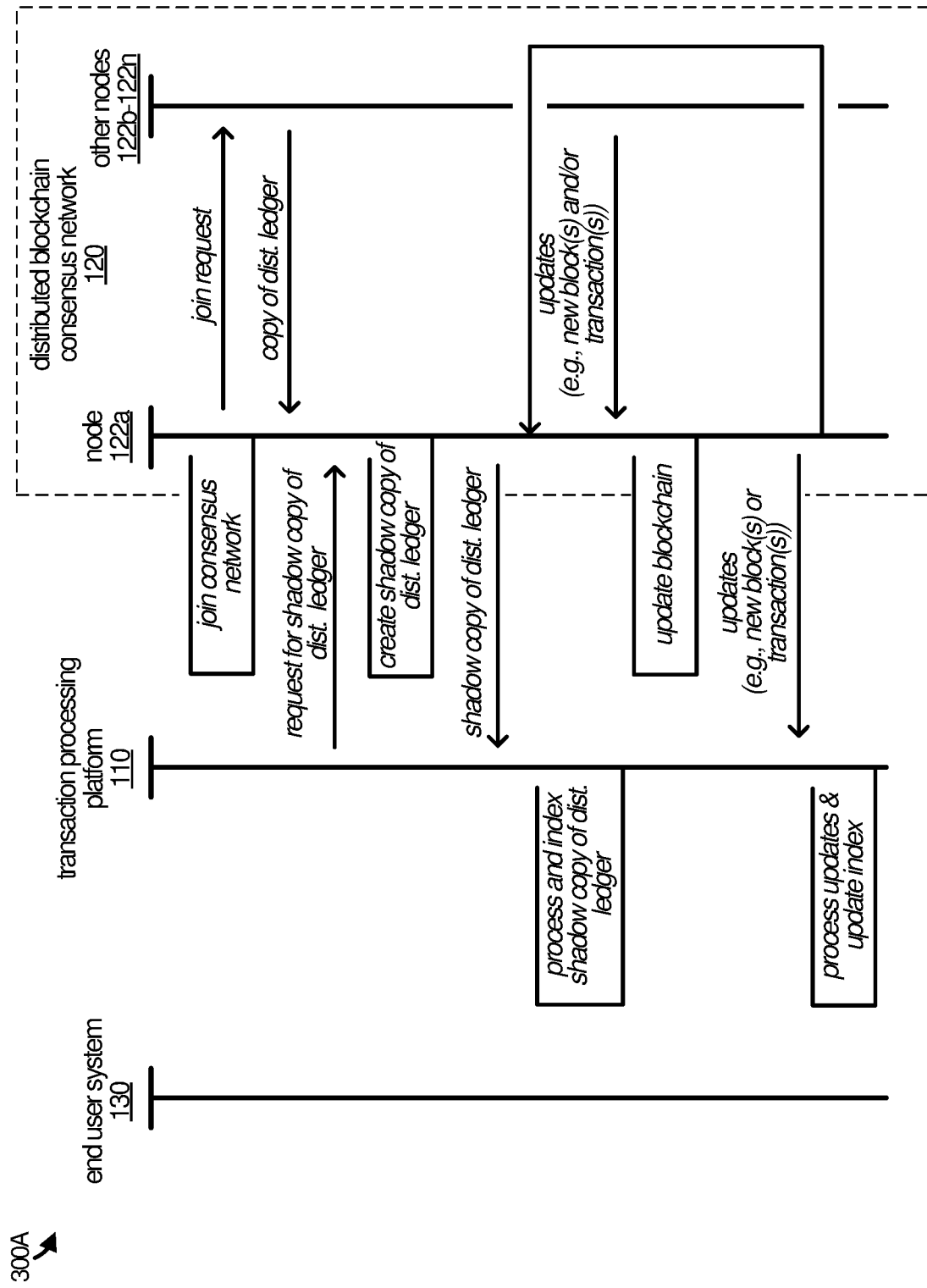
FIGS. 3A and 3B depict sequence diagrams illustrating example operations and communications made by and between end user system, transaction processing platform and distributed blockchain consensus network for expediting blockchain transactions, according to some implementations.
Figure 3B:
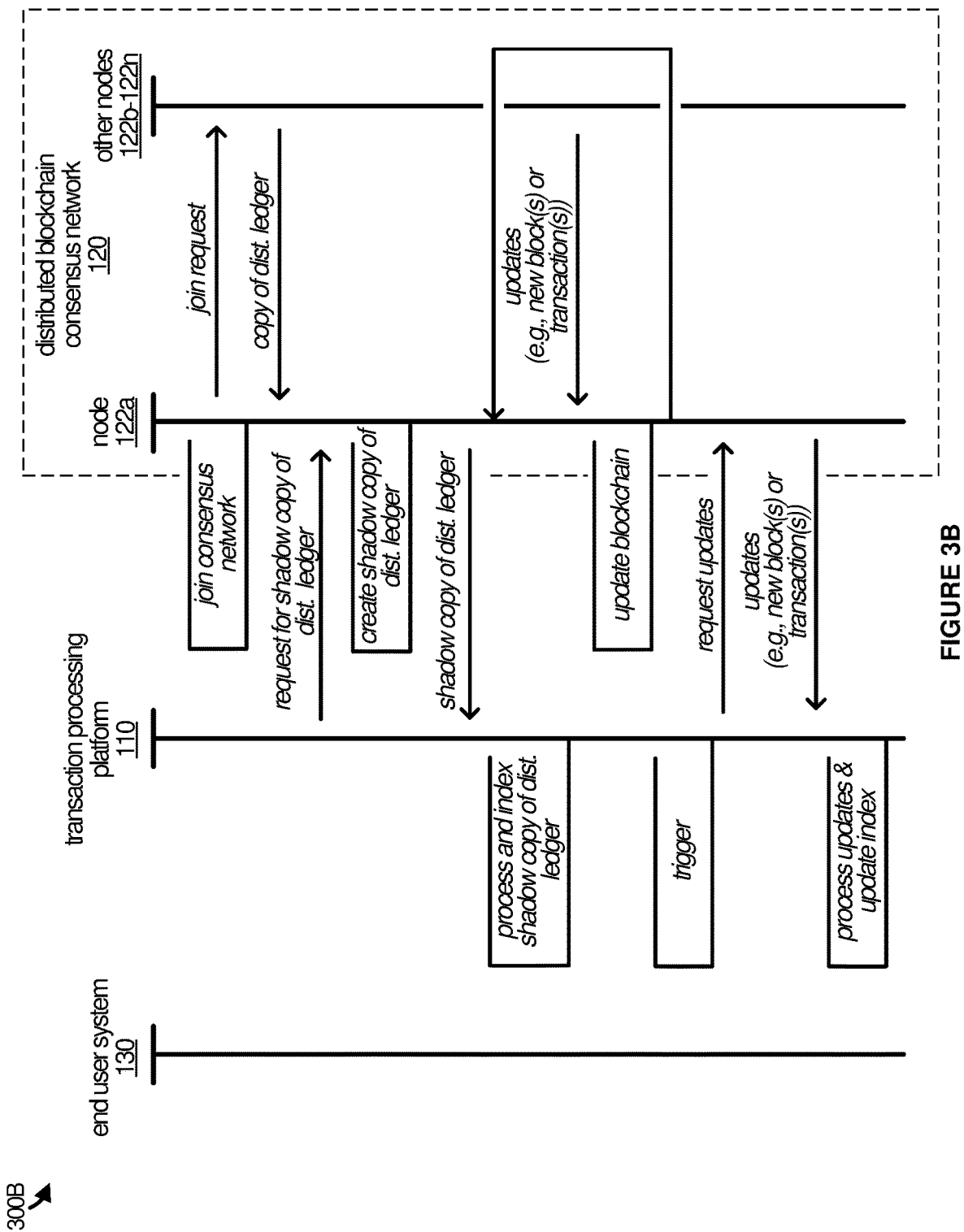

FIGS. 3A and 3B depict sequence diagrams illustrating example operations and communications made by and between end user system 130, transaction processing platform 110 and distributed blockchain consensus network 120 for expediting blockchain transactions, according to some implementations. More specifically, the examples of FIGS. 3A and 3B illustrate pushing and pulling updates to the shadow ledger, respectively. The end user system 130 can be any of end user systems 130a-130d of FIG. 1, although alternative end user systems are also possible. Likewise, transaction processing platform 110 and distributed blockchain consensus network 120 can be the systems from FIG. 1, although alternative configurations are possible.

Referring first to the example of FIG. 3A, initially the edge (or shadow) node 122a makes a determination to join a distributed consensus network 120. As discussed herein, when a node joins the distributed network, the node receives a full copy of the blockchain (or distributed ledger). Like other nodes in the distributed blockchain consensus network, the edge (or shadow) node 122a uses the blockchain (or distributed ledger) to verify past, current and future transactions. For example, when a node creates a new block, the new block is sent to everyone on the network. Each node then verifies the block to make sure that the block has not been tampered with and, if everything checks out, each node adds this block to their own blockchain (or distributed ledger). All the nodes create consensus—agree about which blocks are valid and which are not valid. Blocks that are tampered with are rejected by other nodes in the network.

When the blockchain transaction service initiates operation, it directs the transaction processing platform 110 to request a shadow copy of the distributed ledger from the shadow or edge node 122a. The shadow or edge node 122a receives the request, creates the shadow copy of the distributed ledger and provides the shadow copy to the transaction processing platform 110. Once received, the transaction processing platform 110 processes and indexes the received shadow copy of the distributed ledger. In some implementations, the transaction processing platform 110 analyzes the shadow copy of the distributed ledger to identify only particular aspects, information or attributes contained therein. Alternatively, the entire shadow copy of the distributed ledger can be indexed.

Although not shown in the example of FIG. 3A, in some implementations the transaction processing platform 110 can extract historical transaction information including transaction participant information and pre-generate reputational profiles or scores associated with one or more of the transaction participants. For example, the transaction processing platform 110 can obtain a transaction participant's historical interactions with the blockchain, non-blockchain based contractual or financial dealings, or other non-blockchain based reputational information accessible to the transaction processing platform to facilitate generation of a reputational profile or score for one or more of the transaction participants.

The shadow or edge node 122a then receives blockchain updates, e.g., new blocks and/or blockchain transaction and updates its copy of the distributed ledger (or blockchain) accordingly. Some or all of the updates can also be relayed to the transaction processing platform 110. In some implementations, only new blocks are relayed to the transaction processing platform 110 to reduce signaling overhead. In other implementations, additional information can be provided to the transaction processing platform 110, e.g., new blocks, unconfirmed blockchain transactions (those not yet added to a block), or other information available to a node of the distributed blockchain consensus network 120 etc.

Referring next to the example of FIG. 3B, the example of FIG. 3B is similar to the example of FIG. 3A except that events occurring on the transaction processing platform 110 trigger the transaction processing platform to request updates from the shadow or edge node 122a. The events triggering the request can include, for example, one or more transaction requests initiated by endpoint systems. Other triggers are also possible.

Figure 4:
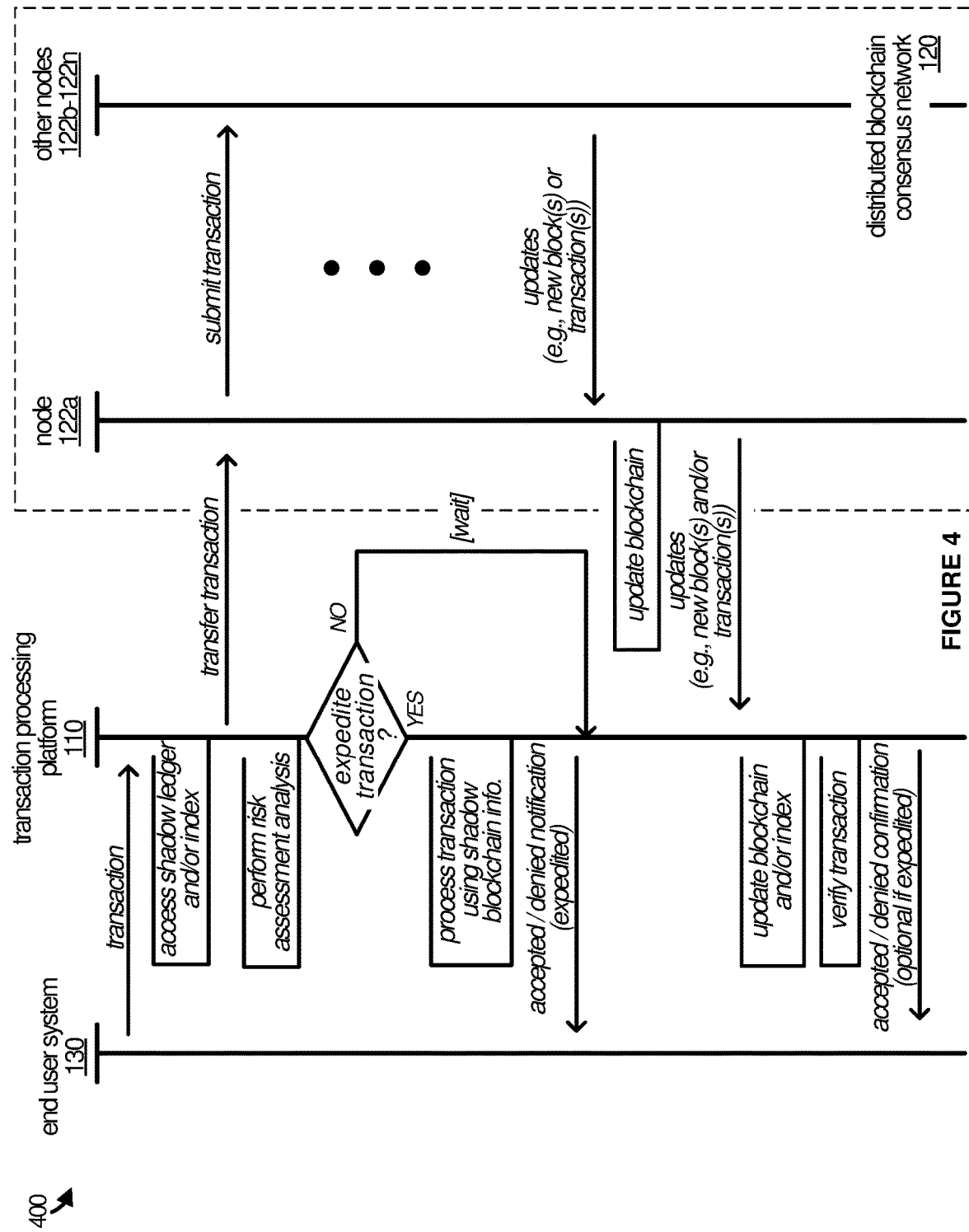
FIG. 4 depicts a sequence diagram illustrating example operations and communications made by and between end user system, transaction processing platform and distributed blockchain consensus network for expediting blockchain transactions, according to some implementations.

FIG. 4 depicts a sequence diagram illustrating example operations and communications made by and between end user system 130, transaction processing platform 110 and distributed blockchain consensus network 120 for expediting blockchain transactions, according to some implementations. More specifically, the example of FIG. 4 illustrates assessing risk associated with expediting processing of blockchain transactions received by a transaction processing platform 110. The end user system 130 can be any of end user systems 130a-130d of FIG. 1, although alternative end user systems are also possible. Likewise, transaction processing platform 110 and distributed blockchain consensus network 120 can be the systems from FIG. 1, although alternative configurations are possible.

To begin, the transaction processing platform 110 receives a transaction request initiated by end user system 130. The transaction request identifies a blockchain transaction including one or more transaction participants. In response to receiving the transaction request, the transaction processing platform 110 accesses a shadow copy of the distributed ledger and/or information or attributes obtained from the shadow copy of the distributed ledger, e.g., indexed ledger information to perform a risk assessment analysis. For example, the risk assessment can include accessing or calculating a risk score for (or associated with) the blockchain transaction. An example illustrating performance of a risk assessment including calculation of a risk score is shown and discussed in greater detail with reference to FIG. 6.

The transaction platform 110 then determines if the blockchain transaction can be expedited by the transaction processing platform based on an output of the risk assessment. For example, the transaction platform 110 can compares the risk score to a risk threshold and expedites the transaction when the risk score is less than the risk threshold. As discussed herein, the blockchain transaction is considered expedited if the transaction is processed by the transaction platform 110 prior to receiving an indication initiated by the blockchain consensus network that the transaction is confirmed (e.g., accepted or added to a block of the blockchain).

When a determination is made that a transaction can be expedited, the transaction processing platform expedites the transaction, e.g., locally processes the blockchain transaction prior to receiving an indication or confirmation from the consensus network that the transaction is confirmed. In this manner, the transaction processing platform acts like a local cache allowing quick access and operation on permanently stored data within the blockchain with minimal or calculated risk.

The transaction processing platform 110 then waits for the indication or confirmation initiated by the consensus network that the blockchain transaction is confirmed. If the indication or notification is received, then the system may notify the end-user system 130 or may do nothing. However, if an indication or notification is received the blockchain transaction is invalid or no indication or notification is received, then the transaction processing platform 110 can perform a reconciliation action as discussed herein.

Figure 5:
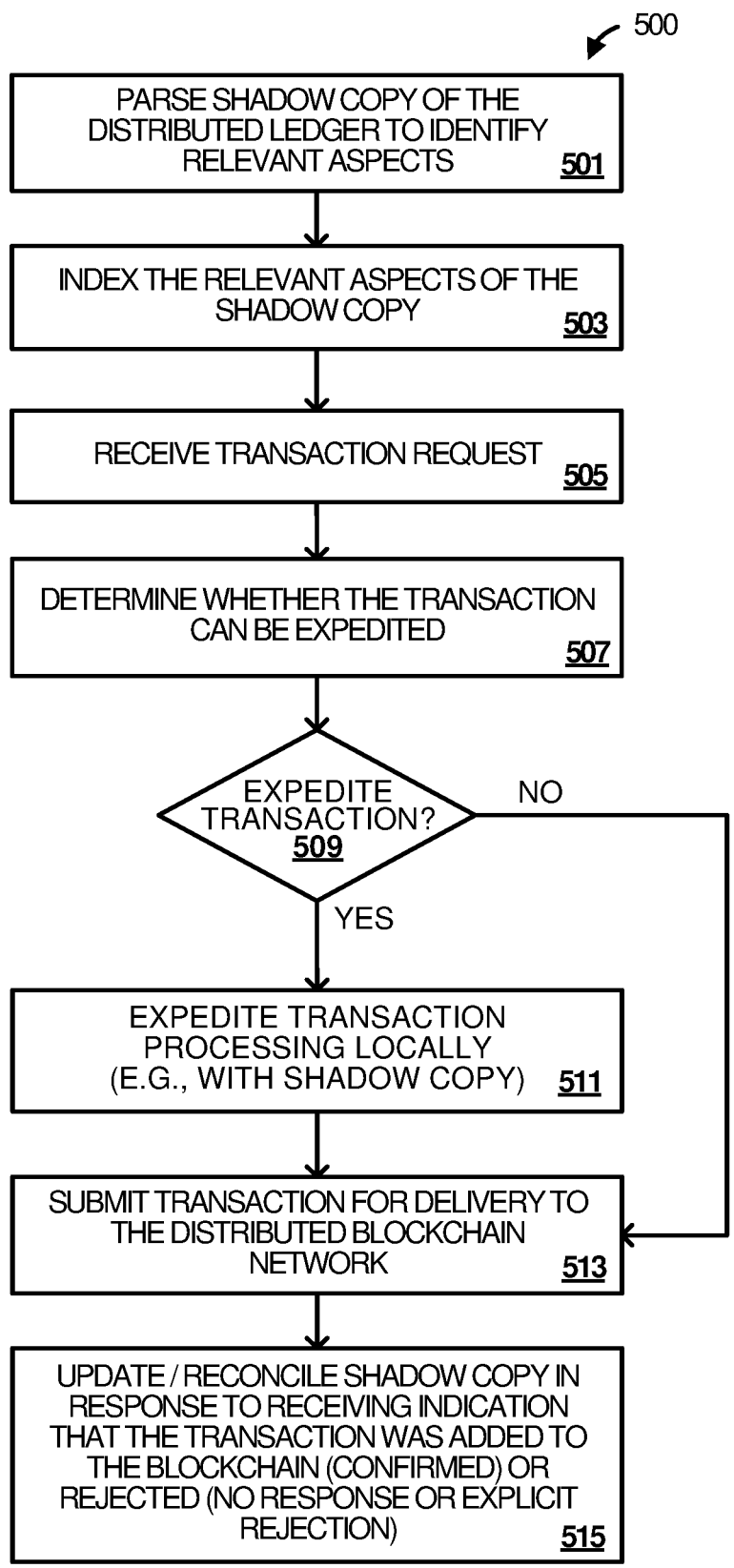
FIG. 5 depicts flow diagram illustrating example operations of one or more components of a transaction processing platform, according to some implementations.

FIG. 5 depicts flow diagram 500 illustrating example operations of one or more components of a transaction processing platform, according to some implementations. More specifically, flow diagram 500 illustrates example operations for expediting blockchain transactions as discussed herein. The transaction processing platform may be transaction processing platform 110 of FIG. 1, although alternative configurations are possible. The example operations may be performed in various implementations by the transaction processing platform 110 of FIG. 1, or one or more processors, extensions, modules, engines, components or tools associated therewith.

To begin, at 501, the transaction processing platform parses a shadow blockchain to identify relevant aspects. As discussed herein, the shadow blockchain can be requested from an edge or shadow node of the distributed blockchain consensus network and received and processed to facilitate locally expediting blockchain transactions. At 503, the transaction processing platform indexes the relevant aspects of the shadow blockchain.

At 505, the transaction processing platform receives a blockchain transaction request. The request can be initiated by an endpoint system, e.g., an end-user system or a gaming terminal or end-user gaming terminal interface system as shown and discussed in greater detail with reference to FIG. 7. Once received, at 507, the transaction processing platform determines whether the transaction can be expedited. At determination 509, the transaction processing platform continues to 513. However, if the transaction can be expedited, at 511, the transaction processing platform expedites the transaction processing locally prior to receiving a notification initiated by the distributed blockchain consensus network that the blockchain transaction is confirmed.

At 513, the transaction processing platform sends the blockchain transaction for delivery to the distributed blockchain consensus network. Although shown at step 513, it is appreciated that the transaction processing platform can send the blockchain transaction for delivery to the consensus blockchain network at any time once it is received. In some implementations, the transaction is submitted as soon as possible to receive a confirmation sooner rather than later. Alternatively, in other implementations, the transaction could be held and submitted at a later time (e.g., used as collateral and only submitted if that is the desired method of transacting).

Lastly, at 515, the transaction processing platform receives updated blockchain information, e.g., new blocks, unconfirmed transactions, etc., and updates and/or reconciled the shadow copy of the distributed ledger accordingly.

Figure 6:
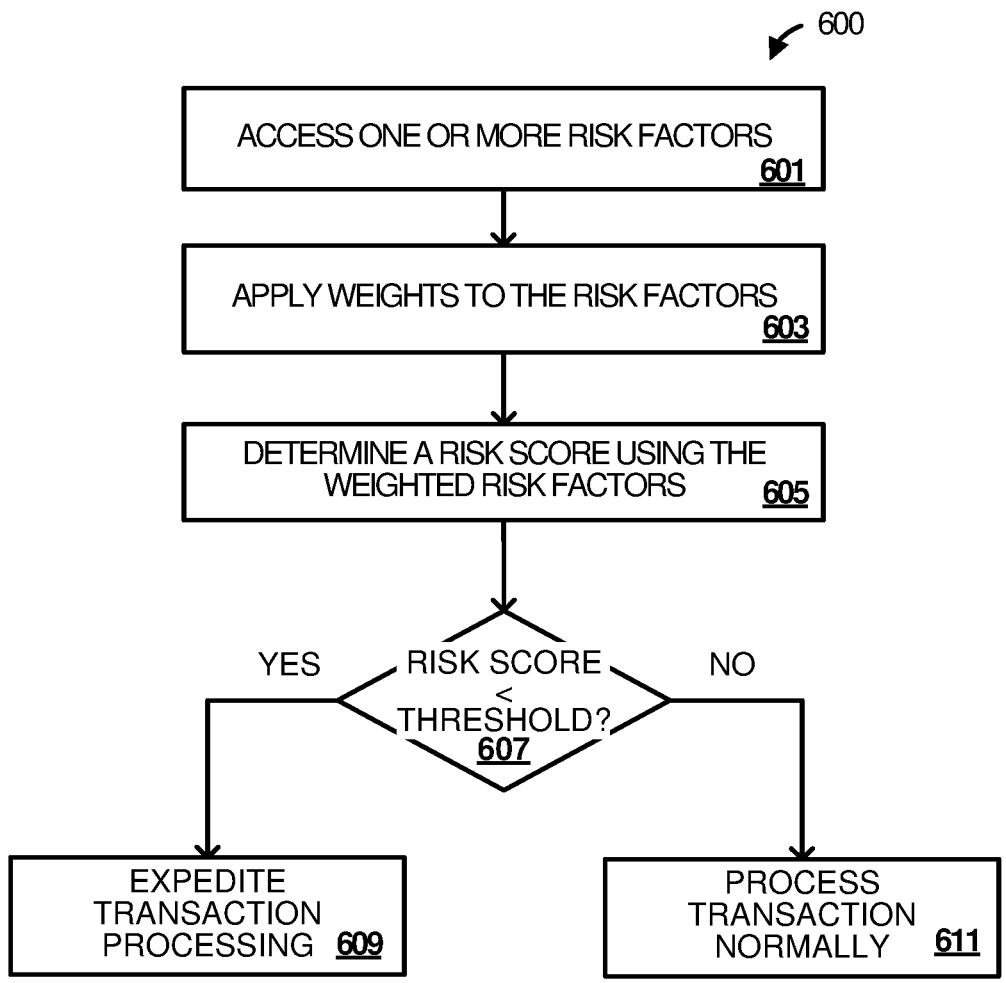
FIG. 6 depicts flow diagram illustrating example operations of one or more components of a transaction processing platform, according to some implementations.

FIG. 6 depicts flow diagram 600 illustrating example operations of one or more components of a transaction processing platform, according to some implementations. More specifically, flow diagram 600 illustrates example operations for determining whether a blockchain transaction can be expedited as discussed herein. The transaction processing platform may be transaction processing platform 110 of FIG. 1, although alternative configurations are possible. The example operations may be performed in various implementations by the transaction processing platform 110 of FIG. 1, or one or more processors, extensions, modules, engines, components or tools associated therewith.

To begin, at 601, the transaction processing platform accesses one or more risk factors associated with the transaction. At 603, the transaction processing platform applies weights to the risk factors. Examples of risk factors include, but are not limited to risk of exposing data, dollar value at risk, transaction risk, reputational risk, blockchain interoperability, security levels, time since last update of the shadow ledger, frequency of transactions (e.g., transaction type rate), degree of user validation and confidence, and the like. At 605, transaction processing platform determines or calculates a risk score associated with the transaction based on the weighted risk factors. At determination 607, the transaction processing platform determines if the risk score is less than a than a risk threshold. If so, at 609, the transaction processing platform determines that the blockchain transaction can be expedited. However, if not, at 611, the transaction processing platform processes the transaction normally (e.g., sends the blockchain transaction for submission to the blockchain consensus network and waits for a confirmation to finalize the transaction).

Figure 7:
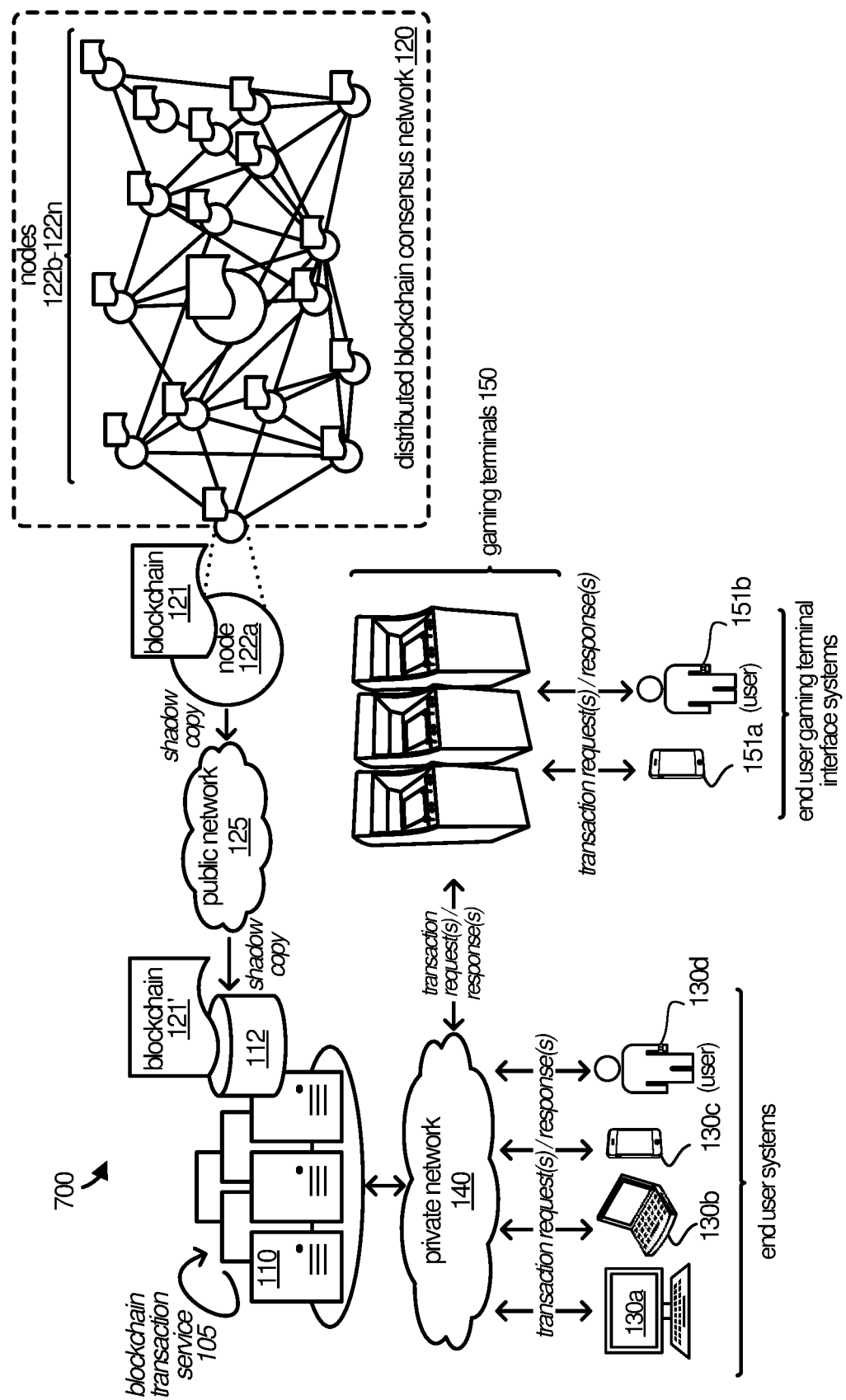
FIG. 7 depicts a block diagram illustrating an example operational architecture operable to locally expedite blockchain transaction processing in a gaming environment, according to some implementations.

FIG. 7 depicts a block diagram illustrating an example operational architecture 700 operable to locally expedite blockchain transaction processing in a gaming environment, according to some implementations. The example operational architecture 700 is similar to operational architecture 100 of FIG. 1A, however, the operational architecture 700 includes a private network 140, gaming terminals 150 associated with end user gaming terminal interface systems 151a and 151b, and a public network 125.

As discussed herein, transaction can be initiated by endpoint systems, e.g., end-user systems, gaming terminals, and/or end user gaming terminal interface systems. These transactions are received by the transaction processing platform over a private network 140 and can be locally processed expeditiously if the transaction processing platform determines that the risk of processing the transaction is sufficiently low. In this way, the transaction processing platform can process low risk transactions more quickly. For example, a financial payment can be made via the endpoint systems and occur as quickly or quicker than a standard credit card transaction.

FIG. 8 depicts a computing system 801, which is representative of any system or collection of systems in which the various applications, services, scenarios, and processes disclosed herein may be implemented. Examples of computing system 801 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 801 may be implemented as a single apparatus, system, or device or may be implemented in a distributed manner as multiple apparatuses, systems, or devices. Computing system 801 includes, but is not limited to, processing system 802, storage system 803, software 805, communication interface system 807, and user interface system 809. Processing system 802 is operatively coupled with storage system 803, communication interface system 807, and user interface system 809 (optional).

Processing system 802 loads and executes software 805 from storage system 803. Software 805 includes various processes, which are generally representative of the processes discussed with respect to the preceding Figures and additional examples below. For example, software 805 may include a process 806 that when executed by processing system 802, executes a blockchain transaction service such as, for example, blockchain transaction service 105 of FIG. 1. When executed by processing system 802, software 805 directs processing system 802 to operate as described herein for at least the various processes, operational scenarios, and sequences discussed in the foregoing implementations. Computing system 801 may optionally include additional devices, features, or functionality not discussed for purposes of brevity.

Referring still to FIG. 8, processing system 802 may comprise a micro-processor and other circuitry that retrieves and executes software 805 from storage system 803. Processing system 802 may be implemented within a single processing device but may also be distributed across multiple processing devices or sub-systems that cooperate in executing program instructions. Examples of processing system 802 include general purpose central processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 803 may also include computer readable communication media over which at least some of software 805 may be communicated internally or externally. Storage system 803 may be implemented as a single storage device but may also be implemented across multiple storage devices or sub-systems co-located or distributed relative to each other. Storage system 803 may comprise additional elements, such as a controller, capable of communicating with processing system 802 or possibly other systems.

Software 805 may be implemented in program instructions and among other functions may, when executed by processing system 802, direct processing system 802 to operate as described with respect to the various operational scenarios, sequences, and processes illustrated herein. In some implementations, software 805 can include one or more processes.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software, virtual machine software, or other application software, in addition to or that include the processes discussed herein. Software 805 may also comprise firmware or some other form of machine-readable processing instructions executable by processing system 802.

In general, software 805 may, when loaded into processing system 802 and executed, transform a suitable apparatus, system, or device (of which computing system 801 is representative) overall from a general-purpose computing system into a special-purpose computing system for handing approximate values in spreadsheet applications. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 809 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 809. In some cases, the input and output devices may be combined in a single device, such as a display capable of displaying images and receiving touch gestures. The aforementioned user input and output devices are well known in the art and need not be discussed at length here.

User interface system 809 may also include associated user interface software executable by processing system 802 in support of the various user input and output devices discussed above. Separately or in conjunction with each other and other hardware and software elements, the user interface software and user interface devices may support a graphical user interface, a natural user interface, or any other type of user interface.

Communication between computing system 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

The techniques discussed herein can be embodied as special-purpose hardware (e.g., circuitry), as programmable circuitry appropriately programmed with software and/or firmware, or as a combination of special-purpose and programmable circuitry. Hence, implementations may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiment shown," "in other embodiments," "in some implementations," "according to some implementations," "in the implementation shown," "in other implementations," and the like generally mean the particular feature, structure, or characteristic following the phrase is included in at least one embodiment or implementation of the present technology and may be included in more than one embodiment or implementation. In addition, such phrases do not necessarily refer to the same or different embodiments or implementations.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A blockchain transaction processing system comprising:

An electronic communication interface operatively coupled to: a blockchain, and an endpoint system, wherein the blockchain is provided by a distributed blockchain consensus network that includes a plurality of processing nodes operable to verify transactions and achieve consensus, wherein each node includes a copy of a distributed ledger; and a processor operatively coupled to the electronic communication interface, wherein the processor is configured to:

receive, via the electronic communication interface, a transaction request identifying a blockchain transaction from the endpoint system;

transmit, via the electronic communications interface, the transaction request to the blockchain for validation;

access, via the electronic communications interface, a shadow copy of the distributed ledger electronically stored separately from the blockchain in one or more storage media operably coupled to the communication interface, the shadow copy including information representative of data stored on at least a portion of the blockchain, wherein at least a portion of the information extracted from the shadow copy includes indexed ledger information and a plurality of varying attributes of transactions or contracts stored at least on a portion of the distributed ledger;

identify, using the shadow copy, one or more risk factors associated with the transaction request;

compute, based on the risk factors and the information representative of data stored on at least a portion of the blockchain, a risk associated with the transaction request being expedited using the shadow copy;

compare the computed risk to a predetermined risk threshold; and for the risk being less than the predetermined risk threshold, enable expedited processing of the transaction request using the shadow copy prior to a notification from the blockchain that the blockchain transaction request is validated being received by the processor via the electronic communication interface.

2. The system of claim 1 further comprising a memory storage device operatively coupled to the processor, wherein the processor is further configured to cause the information representative of data stored on at least a portion of the blockchain to be indexed in the memory storage device.

3. The system of claim 1, wherein to compute the risk, the processor is further configured to identify one or more risk factors associated with the transaction request being expedited using the shadow copy.

4. The system of claim 3, wherein the processor is further configured to:
apply weights to the one or more risk factors; and
compute the risk further based on one or more weighted risk factors.

5. The system of claim 1, wherein the processor is further configured to:
determine an identity of one or more transaction participants based on data of the transaction request; and
compute the risk further based on the identity.

6. The system of claim 5, wherein the processor is further configured to apply a machine learning algorithm to identify or build at least one reputational model associated with the one or more identified transaction participants.

7. The system of claim 5, wherein to compute the risk further based on the identity, the processor is further configured to determine a reputational score associated with the one or more transaction participants based on at least one of:
the information representative of data stored on at least a portion of the blockchain; and
non-blockchain based reputational information accessible by the processor.

8. The system of claim 1, wherein the processor is further configured to, for the risk not being less than the predetermined risk threshold:

disable expedited processing of the transaction request using the shadow copy; and process the blockchain transaction after the notification is received by the processor.

9. The system of claim 1, wherein the processor is further configured to cause, via the electronic communications interface and in response to the notification being received by the processor, the information representative of data stored on at least a portion of the blockchain to be updated in the shadow copy.

10. The system of claim 1, wherein the processor is further configured to:

receive, via the electronic communication interface, a notification from the blockchain that the blockchain transaction request is denied; and in response to the notification from the blockchain that the blockchain transaction request is denied being received by the processor, perform one or more reconciliation actions.

11. A method in a computer system in communication via an electronic communication interface with a blockchain, and an endpoint system, the method comprising:

providing the blockchain from a distributed blockchain consensus network that includes a plurality of processing nodes operable to verify transactions and achieve consensus, wherein each processing node includes a copy of a distributed ledger;

receiving a transaction request identifying a blockchain transaction from the endpoint system;

transmitting the transaction request to the blockchain for validation;

accessing a shadow copy of the distributed ledger electronically stored separately from the blockchain in one or more storage media operably coupled to the communication interface, the shadow copy including information representative of data stored on at least a portion of the blockchain, wherein at least a portion of the information extracted from the shadow copy includes indexed ledger information and a plurality of varying attributes of transactions or contracts stored at least on a portion of the distributed ledger;

identifying, using the shadow copy, one or more risk factors associated with the transaction request;

computing, based on the risk factors and the information representative of data stored on at least a portion of the blockchain, a risk associated with the transaction request being expedited using the shadow copy;

comparing the computed risk to a predetermined risk threshold; and for the risk being less than the predetermined risk threshold, enabling expedited processing of the transaction request using the shadow copy prior to a notification from the blockchain that the blockchain transaction request is validated being received by the computer system.

12. The method of claim 11 further comprising causing the information representative of data stored on at least a portion of the blockchain to be indexed in a memory storage device accessible by the computer system.

13. The method of claim 11, wherein computing the risk comprises identifying one or more risk factors associated with the transaction request being expedited using the shadow copy.

14. The method of claim 13 further comprising:

applying weights to the one or more risk factors; and computing the risk further based on one or more weighted risk factors.

15. The method of claim 11 further comprising:

determining an identity of one or more transaction participants based on data of the transaction request; and computing the risk further based on the identity.

16. The method of claim 15 further comprising applying a machine learning algorithm to identify or build at least one reputational model associated with the one or more identified transaction participants.

17. The method of claim 15, wherein computing the risk further based on the identity comprises determining a reputational score associated with the one or more transaction participants based on at least one of:

the information representative of data stored on at least a portion of the blockchain; and non-blockchain based reputational information accessible by the computer system.

18. The method of claim 11 further comprising, for the risk being greater than or equal to the predetermined risk threshold:

disabling expedited processing of the transaction request using the shadow copy; and processing the blockchain transaction after the notification is received by the computer system.

19. The method of claim 11 further comprising causing, in response to the notification being received by the computing system, the information representative of data stored on at least a portion of the blockchain to be updated in the shadow copy.

20. The method of claim 11 further comprising:

receiving a notification from the blockchain that the blockchain transaction request is denied; and in response to the notification from the blockchain that the blockchain transaction request is denied being received by the computer system, performing one or more reconciliation actions.

21. One or more non-transitory computer readable storage media having program instructions stored thereon which, when executed by at least one processor, cause a computer system to:

provide a blockchain from a distributed blockchain consensus network that includes a plurality of processing nodes operable to verify transactions and achieve consensus, wherein each processing node includes a copy of a distributed ledger;

receive a transaction request over an electronic communication interface identifying a blockchain transaction from an endpoint system;

transmit the transaction request to the blockchain for validation;

access a shadow copy of the distributed ledger electronically stored separately from the blockchain in one or more storage media operably coupled to the communication interface, the shadow copy including information representative of data stored on at least a portion of the blockchain, wherein at least a portion of the information extracted from the shadow copy includes indexed ledger information and a plurality of varying attributes of transactions or contracts stored at least on a portion of the distributed ledger;

identify, using the shadow copy, one or more risk factors associated with the transaction request;

compute, based on the risk factors and the information representative of data stored on at least a portion of the blockchain, a risk associated with the transaction request being expedited using the shadow copy;

compare the computed risk to a predetermined risk threshold; and for the risk being less than the predetermined risk threshold, enable expedited processing of the transaction request using the shadow copy prior to a notification from the blockchain that the blockchain transaction request is validated being received by the computer system.

22. The one or more non-transitory computer readable storage media of claim 21, wherein for the risk not being less than the predetermined threshold, the program instructions further cause the computer system to:
  disable expedited processing of the transaction request using the shadow copy; and
  process the blockchain transaction after the notification is received by the computer system.

23. The one or more non-transitory computer readable storage media of claim 21, wherein when executed by at least one processor, the program instructions further cause the computer system to:
  determine an identity of one or more transaction participants based on data of the transaction request; and
  compute the risk further based on the identity.

* * * * *